(12) United States Patent
Horiguchi

(10) Patent No.: US 8,869,855 B2
(45) Date of Patent: Oct. 28, 2014

(54) PNEUMATIC TIRE

(75) Inventor: Takuya Horiguchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 638 days.

(21) Appl. No.: 12/675,027

(22) PCT Filed: Dec. 18, 2008

(86) PCT No.: PCT/JP2008/073099
§ 371 (c)(1),
(2), (4) Date: Feb. 24, 2010

(87) PCT Pub. No.: WO2009/096113
PCT Pub. Date: Aug. 6, 2009

(65) Prior Publication Data
US 2011/0094648 A1 Apr. 28, 2011

(30) Foreign Application Priority Data
Feb. 1, 2008 (JP) .................. 2008-022823
Dec. 11, 2008 (JP) .................. 2008-315836

(51) Int. Cl.
*B60C 1/00* (2006.01)
*B60C 13/00* (2006.01)
*B29D 30/72* (2006.01)
*C08L 7/00* (2006.01)
*C08L 9/00* (2006.01)

(52) U.S. Cl.
CPC ............. *B60C 1/0025* (2013.04); *B60C 13/00* (2013.01); *B60C 2013/007* (2013.04); *B60C 2013/008* (2013.04); *B29D 30/72* (2013.01); *C08L 7/00* (2013.01); *C08L 9/00* (2013.01); *B60C 2013/006* (2013.04)
USPC .......................................... 152/525; 152/458

(58) Field of Classification Search
CPC ..................................................... B60C 1/0025
USPC .................................. 152/525, 458, 523, 524
See application file for complete search history.

(56) References Cited

U.S. PATENT DOCUMENTS 5,388,627 A * 2/1995 Nakada .................... 152/525 X
5,526,859 A 6/1996 Saito et al.
(Continued)

FOREIGN PATENT DOCUMENTS

DE 601 06 236 T2 3/2006
EP 0 581 549 A1 2/1994
(Continued)

OTHER PUBLICATIONS

English machine translation of JP 2008-105479 A, May 8, 2008.*
(Continued)

*Primary Examiner* — Adrienne C Johnstone
(74) *Attorney, Agent, or Firm* — Birch, Stewart, Kolasch & Birch, LLP

(57) ABSTRACT

In order to improve ride quality and steering stability, the present invention provides a pneumatic tire having a sidewall made of a rubber composition for a sidewall comprising at least a natural rubber and a diene rubber comprising a syndiotactic 1,2-polybutadiene, wherein rubber sheets obtained by extruding at a thickness of at most 1.5 mm the rubber composition for a sidewall with a complex modulus E*a in a tire circumferential direction measured at a temperature of 70° C. and a dynamic distortion of 2% of 3 to 15 MPa are laminated.

4 Claims, 2 Drawing Sheets

(56) References Cited

U.S. PATENT DOCUMENTS

| | | | |
|---|---|---|---|
| 5,707,462 A * | 1/1998 | Kikuchi et al. | 152/525 X |
| 7,060,146 B2 * | 6/2006 | Ikeda et al. | 152/525 X |
| 2001/0050134 A1 | 12/2001 | Iizuka | |
| 2002/0056496 A1 | 5/2002 | Tanaka et al. | |
| 2004/0016495 A1 | 1/2004 | Serra et al. | |
| 2006/0047056 A1 | 3/2006 | Miyazaki | |

FOREIGN PATENT DOCUMENTS

| | | |
|---|---|---|
| JP | 6-87306 A | 3/1994 |
| JP | 6-234303 A | 8/1994 |
| JP | 8-85303 A | 4/1996 |
| JP | 2001-287282 A | 10/2001 |
| JP | 2001-347812 A | 12/2001 |
| JP | 2002-79590 A | 3/2002 |
| JP | 2004-106796 A | 4/2004 |
| JP | 2005-263916 A | 9/2005 |
| JP | 2006-63143 A | 3/2006 |
| JP | 2006-281744 A | 10/2006 |
| JP | 2008-68831 A | 3/2008 |
| JP | 2008105479 A * | 5/2008 |

OTHER PUBLICATIONS

Encyclopedia of Polymer Science and Technology, "Butadiene Polymers", Kerns et al., published online by John Wiley & Sons, 2002, vol. 5 pp. 329-336.*

German Office Action dated Jul. 13, 2012 for German Application No. 11 2008 003 672.1.

* cited by examiner

PNEUMATIC TIRE

TECHNICAL FIELD

The present invention relates to a pneumatic tire.

BACKGROUND ART

The improvement of steering stability and ride quality is required for a vehicle.

In the blending of a rubber composition for a sidewall, blending is carried out so that a complex modulus E* is increased (for example, E* is 3 MPa to 6 MPa) in order to improve steering stability and blending is carried out so that the complex modulus E* is decreased (for example, E* is 2 MPa to 3 MPa) in order to improve ride quality. That is, when, in the blending of a rubber composition for a sidewall, blending is carried out so that a complex modulus E* is increased in order to improve steering stability, it results simultaneously in the deterioration of ride quality; therefore, the steering stability and ride quality has been in the relation of trade-off.

Japanese Unexamined Patent Publication No. 2004-106796 discloses a rubber composition for a sidewall comprising a polybutadiene rubber having a large amount of linear component and blended, a rubber composition for a clinch comprising a polybutadiene rubber having a large amount of linear component and/or a syndiotactic 1,2-polybutadiene, and a pneumatic tire for an automobile having a sidewall and/or clinch made of the rubber composition for a sidewall and/or the rubber composition for a clinch, in order to reduce rolling resistance and improve steering stability (motion performance) of a vehicle, secure requisite rigidity because of high complex modulus even if rubber thickness is reduced and carry out light weight and low fuel cost without decreasing the motion performance. However, since its rubber sheet is thick, orientation is inadequate and there is room for improvement in decreasing its effect by half.

Japanese Unexamined Patent Publication No. 2006-63143 discloses a rubber composition for a sidewall or a clinch comprising rubber components comprising a polybutadiene rubber comprising syndiotactic 1,2-polybutadiene crystals and a tin-modified polybutadiene rubber in order to improve cut resistance and crack growth resistance and the low fuel cost of a vehicle, and a sidewall or clinch made of the rubber composition for a sidewall or a clinch. However, there is room for improvement in improving both steering stability and ride quality.

Japanese Unexamined Patent Publication No. 2006-281744 discloses a pneumatic tire comprising a base tread prepared by laminating rubber sheets obtained by extruding a rubber composition comprising a diene rubber comprising a syndiotactic 1,2-polybutadiene at a thickness of at most 1 mm, in which a complex modulus E*a in a tire circumferential direction measured at a temperature of 70° C. and a dynamic distortion of 2% is 3 to 6 MPa and tan δ is 0.05 to 0.1, in order to improve ride quality and steering stability without increasing rolling resistance. However, Japanese Unexamined Patent Publication No. 2006-281744 relates to a base tread and its use is different from the present invention and the blending of a rubber composition is also different.

Although many patent literatures disclose a pneumatic tire having a sidewall made of a rubber composition for a sidewall comprising a syndiotactic 1,2-polybutadiene, it is a pneumatic tire comprising a sidewall integrally extruded. When an extruding gauge is thick, staple fibers are hardly oriented in an extruding direction, the effect of anisotropy is little and it is difficult to improve steering stability and ride quality in good balance.

DISCLOSURE OF INVENTION

It is an object of the present invention to provide a pneumatic tire improving ride quality and steering stability.

The present invention relates to a pneumatic tire having a sidewall made of a rubber composition for a sidewall comprising a rubber component comprising at least a natural rubber and a diene rubber comprising a syndiotactic 1,2-polybutadiene, wherein the sidewall is prepared by laminating rubber sheets obtained by extruding, at a thickness of at most 1.5 mm, the rubber composition for a sidewall with a complex modulus E*a of 3 to 15 MPa in a tire circumferential direction measured at 70° C. at a dynamic distortion of 2%.

In the pneumatic tire, the ratio (E*a/E*b) of a complex modulus E*a in a tire circumferential direction to a complex modulus E*b in a tire radial direction measured at 70° C. at a dynamic distortion of 2% is preferably at least 1.3.

EXPLANATION OF SYMBOLS

Figure 1:
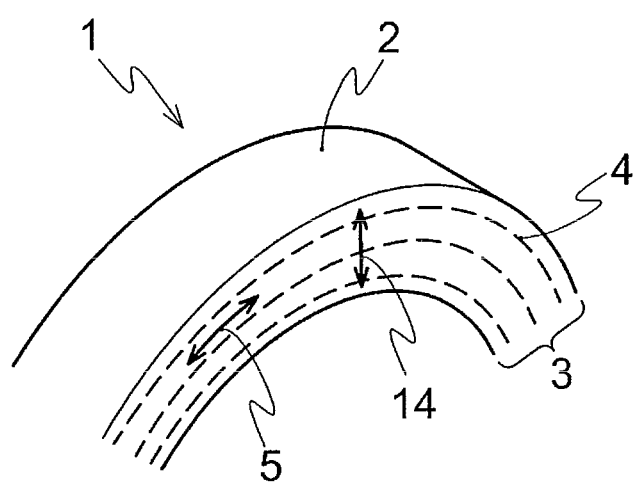
FIG. 1 is a schematic perspective view showing a state in which staple fibers are oriented in a tire circumferential direction in the pneumatic tire having the sidewall of the present invention.

1 Pneumatic tire
2 Tread
3 Sidewall comprising laminate of rubber sheets
4, 9 Staple fiber
5 Orientation direction of staple fiber on tire
6 Rubber composition
7 Calendar roll
8 Rubber sheet
10 Orientation direction of staple fiber
11 Rubber sheet which the orientation direction of the staple fiber on tire is the circumferential direction
12 Laminate of rubber sheets of sidewall
13 Tire molding machine
14 Radial direction on tire

BEST MODE FOR CARRYING OUT THE INVENTION

The pneumatic tire of the present invention is a pneumatic tire having a sidewall made of a rubber composition comprising a rubber component comprising at least a natural rubber and a diene rubber comprising a syndiotactic 1,2-polybutadiene, wherein rubber sheets obtained by extruding at a thickness of not more than 1.5 mm the rubber composition for a sidewall with a complex modulus E*a in a tire circumferential direction measured at a temperature of 70° C. and a dynamic distortion of 2% of 3 to 15 MPa are laminated.

The rubber composition for a sidewall used for the sidewall constituting the pneumatic tire of the present invention comprises a diene rubber comprising a syndiotactic 1,2-polybutadiene as a rubber component. Specifically, the diene rubber is preferably a rubber obtained by combining a highly crystalline syndiotactic 1,2-polybutadiene with a high cis-polybutadiene such as VCR manufactured by Ube Industries, Ltd. Although the diene rubber comprising a syndiotactic 1,2-polybutadiene shows equivalent exothermic heat in comparison with a general diene rubber, it has an advantage of obtaining a rubber with high hardness. Consequently, when the diene rubber comprising a syndiotactic 1,2-polybutadiene is used, the hardness of the rubber composition can be enhanced without blending a large amount of filler such as carbon black and silica, and therefore, the rubber composition has low heat build-up property. Further, the ride quality and steering stability of the pneumatic tire is improved because the use of the diene rubber comprising a syndiotactic 1,2-polybutadiene can expect the anisotropic effect of the rubber.

Here, the highly crystalline syndiotactic 1,2-polybutadiene is a staple fiber.

As the diene rubber comprising a syndiotactic 1,2-polybutadiene, a butadiene rubber comprising a syndiotactic 1,2-polybutadiene such as, for example, VCR-303, 412 and 617 manufactured by Ube Industries, Ltd., can be used.

The content of an article insoluble in boiling n-hexane is preferably not less than 3% by weight in the diene rubber comprising a syndiotactic 1,2-polybutadiene and more preferably not less than 5% by weight. When the content is less than 3% by weight, blending property is decreased because the proportion of the syndiotactic 1,2-polybutadiene tends to be decreased, and the improving effect of steering stability tends to be decreased. Further, the content of the article insoluble in boiling n-hexane is preferably not more than 25% by weight and more preferably not more than 20% by weight. When the content exceeds 25% by weight, a crystalline component tends to be increased and flex fatigue resistance performance tends to be inferior. Here, the article insoluble in boiling n-hexane indicates a syndiotactic 1,2-polybutadiene in the diene rubber.

For example, VCR412 manufactured by Ube Industries, Ltd., is a butadiene rubber having syndiotactic 1,2-polybutadiene crystals dispersed and comprises 12% by weight of syndiotactic 1,2-polybutadiene.

The rubber composition for a sidewall used for the sidewall constituting the pneumatic tire of the present invention comprises a natural rubber (NR) as a rubber component in addition to a diene rubber comprising a syndiotactic 1,2-polybutadiene because of being capable of improving the processability of the rubber and improving tensile fracture property.

Further, in the rubber composition for a sidewall used for the sidewall constituting the pneumatic tire of the present invention, a styrene-butadiene rubber (SBR) and an isoprene rubber (IR) can be blended in addition to the diene rubber comprising a syndiotactic 1,2-polybutadiene and NR.

In the rubber component constituting the rubber composition for a sidewall, the content of the diene rubber comprising a syndiotactic 1,2-polybutadiene is preferably 20 to 70% by weight and more preferably 30 to 60% by weight because of being capable of improving the cut resistance and crack growth resistance.

In the rubber component constituting the rubber composition for a sidewall, the content of the natural rubber (NR) is preferably 30 to 80% by weight and more preferably 40 to 70% by weight because of being capable of improving the processability of the rubber and improving tensile fracture property.

In the rubber composition for a sidewall used for the sidewall constituting the pneumatic tire of the present invention, carbon black as a filler for reinforcement is preferably blended in addition to the rubber components.

The nitrogen adsorption specific surface area ($N_2SA$) of carbon black is preferably not less than 35 $m^2/g$, more preferably not less than 45 $m^2/g$, further preferably not less than 55 $m^2/g$ and particularly preferably not less than 65 $m^2/g$. When $N_2SA$ is less than 35 $m^2/g$, the particles of carbon black are enlarged, reinforcement property tends to be inferior and as a result, crack resistance performance and fracture strength tends to be inferior. Further, the nitrogen adsorption specific surface area ($N_2SA$) of carbon black is preferably not more than 100 $m^2/g$ and more preferably not more than 85 $m^2/g$. When $N_2SA$ exceeds 100 $m^2/g$, exothermic heat tends to be enlarged and rolling resistance tends to be increased.

The blending amount of carbon black is preferably 30 to 60 parts by weight based on 100 parts by weight of the rubber components. When the blending amount is less than 30 parts by weight, reinforcement property for the rubber tends to be little, modulus tends to be lowered and steering stability tends to be lowered. Further, when the content exceeds 60 parts by weight, rolling resistance tends to be increased because the exothermic heat of the rubber tends to be enlarged.

In the rubber composition, a softening agent, wax, an antioxidant, stearic acid, zinc oxide, sulfur and a vulcanization accelerator that are generally used for the rubber composition for a sidewall can be suitably blended, in addition to the above-described rubber components and carbon black. Further, those blending amounts can be general amounts.

In general, in the case of having staple fibers (for example, syndiotactic 1,2-polybutadiene), the thinner the thickness of extrusion and the thickness of a sheet extruded with rolls are, the larger the ratio of elastic modulus in an extrusion direction to elastic modulus in a longitudinal direction is. In a sidewall of a tire, the use of thinly extruded rubber sheets so that staple fibers are oriented in the circumferential direction of the sidewall can improve steering stability. When the orientation direction of the staple fiber is not a circumferential direction, for example, when it is a radial direction, the steering stability is not improved.

When, in the blending of a rubber composition for a sidewall, blending, where a complex modulus E* is increased in order to improve steering stability, is carried out, it results simultaneously in the deterioration of ride quality. However, by using a sidewall where staple fibers are oriented in the circumferential direction of the sidewall, since elastic modulus in a direction where the staple fibers are not oriented is not high, ride quality is not deteriorated.

FIG. 1 is a schematic perspective view showing a state in which staple fibers are oriented in a tire circumferential direction in the pneumatic tire having the sidewall of the present invention.

The phrase the staple fibers are oriented in the circumferential direction of the sidewall of a tire, as described herein, means that staple fibers 4 are oriented (orientation 5 in the circumferential direction of the staple fiber on the tire) in the circumferential direction of a pneumatic tire 1 in a sidewall 3 which is made of the laminate of rubber sheets. Further FIG. 1 shows radial direction 14 on tire and FIG. 1 shows a tread 2.

Further, it can be confirmed by measuring the complex modulus in a circumferential direction and to a radial direction that the staple fibers are oriented in the circumferential direction of the sidewall of the tire. Further, it can be also confirmed from the result of the anisotropic effect of the complex modulus that the staple fibers are oriented in the circumferential direction of the sidewall of the tire.

Figure 2:
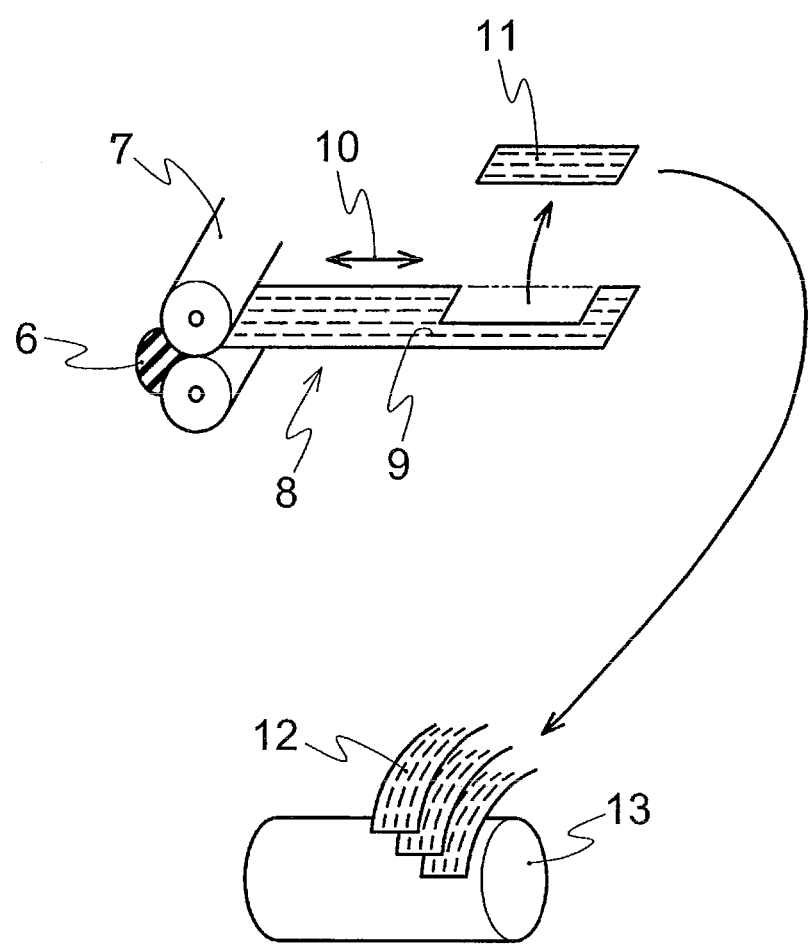
FIG. 2 is an illustration view showing preparation of the pneumatic tire having a sidewall comprising rubber sheets laminated in the pneumatic tire having the sidewall of the present invention.

FIG. 2 is an illustration view showing the preparation of the pneumatic tire having a sidewall obtained by laminating rubber sheets, in the pneumatic tire having the sidewall of the present invention.

A rubber composition 6 is extruded with calendar rolls 7 to prepare a rubber sheet 8. FIG. 2 shows staple fibers 9 on the rubber sheet 8 and shows an orientation direction 10 of the staple fibers. Rubber sheet 11 where the orientation direction of the staple fiber on tire is the circumferential direction are obtained from the rubber sheet 8 extruded and a laminate 12 of the rubber sheets of the sidewall is prepared on a tire molding machine 13.

The sidewall constituting the pneumatic tire of the present invention extrudes rubber sheets within a range in which the upper limit value of thickness is 1.5 mm and the upper limit of thickness is preferably 1 mm, from the rubber composition for a sidewall. Further, it extrudes rubber sheets within a range in which the lower limit value of thickness is 0.2 mm and the lower limit value of thickness is preferably 0.8 mm. The setting of the thickness of the rubber sheets as at most 1.5 mm can arrange the alignment (orientation) direction of the syndiotactic 1,2-polybutadiene in the diene rubber and a sidewall obtained by laminating the rubber sheets can have an adequate complex modulus at the tire circumferential direction. When the thickness of the rubber sheets exceeds 1.5 mm, syndiotactic 1,2-polybutadiene fibers are hardly oriented in the rubber sheet and the steering stability of a vehicle loading the pneumatic tires obtained is lowered. Further, when the thickness of the rubber sheets is less than 0.2 mm, it is too thin and tends to be inferior in processability.

In the sidewall constituting the pneumatic tire of the present invention, the thinner the thickness of extrusion and thickness of a rubber sheet extruded with rolls are, the larger the anisotropic effect is. When the rubber passes between rolls, the rubber is stretched in an extrusion direction, but the thinner the gauge between rolls is, the larger the stretching effect to an extrusion direction at passing between rolls is. As a result, the staple fibers are easily oriented in the extrusion direction. The staple fibers of the rubber sheet extruded from an extruder are oriented in parallel to a direction in which they are extruded from the extruder (refer to FIGS. 1 and 2) and the rubber sheet oriented in the circumferential direction of the sidewall of the tire can be obtained.

In the pneumatic tire of the present invention, the sidewall is prepared by pasting and laminating the extruded rubber sheets.

Since the reinforcement property of the sidewall obtained from one extruded rubber sheet with a thickness of at most 1.5 mm is low, cut resistance performance can be improved by pasting and laminating the extruded rubber sheets and increasing the thickness of the rubber layer of the sidewall.

Further, when the extruded rubber sheets are spirally wound and take a structure in which they have no joint portion within the one circuit of a tire, it can be expected that force variation (FV) is also bettered in addition to steering stability and ride quality.

The joint portion within the one circuit of a tire, as described in the present invention, means the joint (the joint crossing the whole sidewall is usually only one) crossing the whole tire, which can be made usually one, when one sidewall is wound to prepare a tire.

The thickness of the sidewall prepared by pasting and laminating the rubber sheets is preferably not less than 2 mm and more preferably not less than 2.5 mm because of cut resistance performance. Further, the thickness of the sidewall prepared by pasting and laminating the rubber sheets is preferably not more than 6 mm and more preferably not more than 5 mm because of being capable of suppressing the deterioration of ride quality and suppressing the deterioration of rolling resistance.

The pneumatic tire of the present invention can be obtained by pasting the sidewall with other tire members to prepare an unvulcanized tire and vulcanizing the unvulcanized tire by heating under pressurization. Here, examples of the other tire members include a tread, a clinch apex, a carcass, a bead and an inner liner. For example, the pneumatic tire can comprise a carcass and a tread in addition to the sidewall and the sidewall is pasted with both the carcass and the thread in the pneumatic tire.

In the sidewall in the pneumatic tire of the present invention, a complex modulus $E^*a$ in a tire circumferential direction of the sidewall measured at a temperature of 70° C. and a dynamic distortion of 2% is not less than 3 MPa and preferably not less than 3.5 MPa. When the complex modulus $E^*a$ is less than 3 MPa, the steering stability of a vehicle is deteriorated because modulus is low. Further, the complex modulus $E^*a$ in a tire circumferential direction of the sidewall measured at a temperature of 70° C. and a dynamic distortion of 2% is not more than 15 MPa and preferably not more than 12 MPa. When the complex modulus $E^*a$ exceeds 15 MPa, ride quality is deteriorated.

The pneumatic tire having the sidewall made of the rubber composition for a sidewall of the present invention is characterized in that the rubber composition for a sidewall used has a complex modulus $E^*a$ in a tire circumferential direction measured at a temperature of 70° C. and a dynamic distortion of 2% of 3 to 15 MPa.

Further, the rubber composition for a sidewall having a complex modulus $E^*a$ in a tire circumferential direction measured at a temperature of 70° C. and a dynamic distortion of 2% of 3 to 15 MPa can be produced by the production method of a pneumatic tire described in, for example, Japanese Unexamined Patent Publication No. 2006-281744.

Further, the physical properties of the rubber composition for a sidewall having a complex modulus $E^*a$ in a tire circumferential direction measured at a temperature of 70° C. and a dynamic distortion of 2% of 3 to 15 MPa can be confirmed by cutting a sample piece in a strip shape in a circumferential direction and measuring the complex modulus.

Herewith, cutting a sample piece in a strip shape in a circumferential direction on tire (see FIG. 1, orientation direction 5 of staple fiber on tire) means cutting a sample piece with taking the long length of a strip shape in a tire circumferential direction, setting tire axial to the core. And a complex modulus $E^*a$ is measured by causing a dynamic distortion in the long length direction.

In the sidewall in the pneumatic tire of the present invention, a complex modulus $E^*b$ in a tire radial direction of the sidewall measured at a temperature of 70° C. and a dynamic distortion of 2% is preferably 2.0 to 11.0 MPa and more preferably 2.5 to 8 MPa. When the complex modulus $E^*b$ is less than 2 MPa, the steering stability of a vehicle tends to be lowered because modulus is low. Further, when the complex modulus $E^*b$ exceeds 11.0 MPa, ride quality tends to be deteriorated.

Further, in the rubber composition for a sidewall having a complex modulus $E^*b$ in a tire radial direction measured at a temperature of 70° C. and a dynamic distortion of 2% of 2.0 to 11.0 MPa, hardness in a radial direction is basically determined by the amount of carbon black, the amount of oil and vulcanization system and only hardness in an oriented direction is improved by charging and orienting staple fibers therein.

Further, the physical properties of the rubber composition for a sidewall having a complex modulus $E^*b$ in a tire radial direction measured at a temperature of 70° C. and a dynamic distortion of 2% of 2.0 to 11.0 MPa can be confirmed by cutting a sample piece in a strip shape in a radial direction and measuring it.

Herewith, cutting a sample piece in a strip shape in a radial direction on tire (see FIG. 1, radial direction 14 on tire) means cutting a sample piece with taking the long length of a strip shape in a tire radial direction, setting tire axial to the core. And a complex modulus $E^*b$ is measured by causing a dynamic distortion in the long length direction.

The ratio ($E^*a/E^*b$) of the complex modulus $E^*a$ to the complex modulus $E^*b$ is preferably not less than 1.3 and more preferably not less than 1.4. When the $E^*a/E^*b$ is less than 1.3, the balance of steering stability and ride quality tends to be lowered. Further, the $E^*a/E^*b$ is preferably not more than 3 and more preferably not more than 2.5. When the $E^*a/E^*b$ exceeds 3, the balance of steering stability and ride quality tends to be lowered.

In the sidewall of the pneumatic tire of the present invention, the loss tangent tan δ of the sidewall measured at a temperature of 70° C. and a dynamic distortion of 2% is preferably not more than 0.25 and more preferably not more than 0.22 because fuel saving can be improved.

Further, the rubber composition for a sidewall in which the loss tangent tan δ of the sidewall measured at a temperature of 70° C. and a dynamic distortion of 2% is at most 0.25 can be produced by the production method of a pneumatic tire described in, for example, Japanese Unexamined Patent Publication No. 2006-281744.

Further, the physical properties of the rubber composition for a sidewall in which the loss tangent tan δ of the tire sidewall measured at a temperature of 70° C. and a dynamic distortion of 2% is at most 0.25 can be confirmed by cutting a sample piece in a strip shape in a circumferential direction and measuring the complex modulus.

EXAMPLES

The present invention is described in detail based on Examples, but the present invention is not limited to only these Examples.

Chemicals used in Examples are described below.
NR: RSS#3
BR: BR130 manufactured by Ube Industries, Ltd.
Polybutadiene rubber comprising a syndiotactic 1,2-polybutadiene (VCR) (1): VCR412 manufactured by Ube Industries, Ltd. (Syndiotactic 1,2-polybutadiene crystal dispersion, the content of syndiotactic 1,2-polybutadiene crystals: 12% by weight, the content of an article insoluble in boiling n-hexane (the content of syndiotactic 1,2-polybutadiene in a diene rubber): 12% by weight).
Polybutadiene rubber comprising a syndiotactic 1,2-polybutadiene (VCR) (2): VCR617 manufactured by Ube Industries, Ltd. (Syndiotactic 1,2-polybutadiene crystal dispersion, the content of syndiotactic 1,2-polybutadiene crystals: 17% by weight, the content of an article insoluble in boiling n-hexane: 15 to 18% by weight).
Carbon black: N351 ($N_2SA$: 80 $m^2/g$) manufactured by SHOWA CABOT K.K.
Process oil: DAIANA PROCESS AH40 manufactured by Idemitsu Kosan Co., Ltd.
Wax: SUNNOC WAX manufactured by OUCHI SHINKO CHEMICAL INDUSTRIAL CO., LTD.
Antioxidant: OZONONE 6C manufactured by Seiko Chemical Co., Ltd.
Stearic acid: KIRI manufactured by NOF CORPORATION
Zinc oxide: GINREI R manufactured by Toho Zinc Co., Ltd.
Sulfur: SULFUR available from Tsurumi Chemical Industry Co., Ltd.
Vulcanization accelerator: NOCCELER NS (N-tert-butyl-2-benzothiazolylsulfeneamide) manufactured by OUCHI-SHINKO CHEMICAL INDUSTRIAL CO., LTD.

Examples 1 to 10 and Comparative Examples 1 to 3

<Production of Pneumatic Tire>

At blending shown in Table 1 to 3, bases were kneaded at about 150° C. for 5 minutes, then at finishing blending shown in Table 1, vulcanizing agents (sulfur and vulcanization accelerator) were added and the mixture was kneaded at about 80° C. for 5 minutes with a biaxial open roll.

The rubber composition for a sidewall obtained was extruded with rolls to prepare respective sheets at sheet thicknesses at extrusion with the roll shown in Table 1 to 3 and the sheets were laminated to prepare sidewalls with the number of sheets shown in Table 1 to 3.

The sidewalls prepared were pasted with another tire member to mold an unvulcanized tire, vulcanization was carried out for 12 minutes under the condition of a temperature of 175° C. and 20 kgf to produce a tire for an automobile of 225/55R17 and it was used for tests described below.

The "joint number in one circuit" in Table 1 means the number of section crossing the whole sidewall portion at one section.

<Test Methods>

(Viscoelasticity Test)

Test pieces in a tire circumferential direction and in a radial direction were prepared from a new rubber composition for a sidewall prepared and the measurement of the complex modulus $E^*a$ in the tire circumferential direction of the test pieces and the complex modulus $E^*b$ in the tire radial direction were carried out under the conditions of a frequency of 10 Hz, a dynamic strain of 2% and a temperature of 70° C. using a viscoelastic spectrometer manufactured by Iwamoto Seisakusyo K.K. The higher the $E^*a$ and $E^*b$ are, the better the steering stability of a vehicle is. However, when the complex modulus $E^*a$ exceeds 15 MPa, or the complex modulus $E^*b$ exceeds 11 MPa, ride quality is deteriorated.

(Steering Stability Test and Ride Quality Test in In-vehicle)

Tires were loaded on a 3000 cc high performance car and the feeling evaluation of the steering stability and ride quality was carried out on a test course at general running condition.

It is indicated that steering stability is goodness at 3, tire rigidity is slightly insufficient at 2 and tire rigidity is particularly insufficient at 1.

Further, it is indicated that the ride quality is goodness at 3, the tire is slightly hard and not soft at 2 and the tire is too hard at 1.

(Force Variation, FV)

It is an index showing the uniformity of a tire. Radial force variation (RFV, unit: kN) was measured with a uniformity measuring instrument. Comparative Example 1 was set as the basis of uniformity and test pieces were respectively evaluated. When the uniformity is high, it is state in which vibration occurs hardly at the rotation of a tire.

(Cut Resistance)

Scratch was loaded with a cut resistance index pendulum type impact cut tester, using a blade with a width of 20 mm made of ion steel. The depth of scratch was respectively indexed setting Comparative Example 1 as 100. The larger the index is, the more superior the cut resistance is.

(Crack Growth Resistance)

The length of crack at bending 120 thousands times was measured in accordance with the bending test of JIS-K6301.

The length of crack was respectively indexed setting Comparative Example 1 as 100. The larger the index is, the more superior the crack growth resistance is.

(Processability)

The evaluation result of processability can be used as the index of productivity. Evaluation was carried out by visual evaluation of the shape of extrusion texture and the easiness of processing at 3 stages. In the evaluation result of processability, it is indicated that "○" is good in processability, "Δ" is slightly inferior in molding and processability, and "X" is greatly inferior in molding and processability.

In Table 1, Example 2 shows a pneumatic tire containing a decreased amount of carbon black as compared with Example 1 in Table 1.

Side wall of Example 3 was made of spirally wound rubber strips, where rubber strips were wound. That is, the side wall of Example 3 was made of rubber member (rubber sheet) comprising three rubber strips spirally laminated and wound to a tire axial, where each of strips had an overlap width, and there was no joint portion within the one circuit of a tire. In Comparative Examples 1 and 2, polybutadiene rubber comprising a syndiotactic 1,2-polybutadiene was not compounded. In Comparative Example 3, thickness of a rubber sheet extruded with rolls was 3 mm and one sheet was wound to make a sidewall of a tire.

In Table 2, Example 4 shows a tire having a sidewall prepared in the same manner as in Example 1 except that polybutadiene rubber comprising a syndiotactic 1,2-polybutadiene (2) was used instead of polybutadiene rubber comprising a syndiotactic 1,2-polybutadiene (1). In Examples 5 to 8, the blending amount of polybutadiene rubber comprising a syndiotactic 1,2-polybutadiene (1) was changed as compared with Example 1.

In Examples 8 to 10 shown in Table 3, thickness of a sheet at extrusion with rolls was changed. Here, the number of laminated rubber sheets was properly adjusted so as to give thickness of the sidewall of about 3 mm.

TABLE 1

|  | Example | | | Comparative Example | | |
|---|---|---|---|---|---|---|
|  | 1 | 2 | 3 | 1 | 2 | 3 |
| Blending amount (parts by weight) | | | | | | |
| Base | | | | | | |
| NR | 40 | 40 | 40 | 40 | 40 | 40 |
| BR130B | — | — | — | 60 | 60 | — |
| Syndiotactic 1,2-polybutadiene rubber (1) | 60 | 60 | 60 | — | — | 60 |
| Carbon black | 55 | 50 | 55 | 55 | 60 | 55 |
| Aroma oil | 10 | 10 | 10 | 10 | 10 | 10 |
| Wax | 2 | 2 | 2 | 2 | 2 | 2 |
| Antioxidant | 2 | 2 | 2 | 2 | 2 | 2 |
| Stearic acid | 2 | 2 | 2 | 2 | 2 | 2 |
| Zinc oxide | 2 | 2 | 2 | 2 | 2 | 2 |
| Vulcanizing agent | | | | | | |
| Sulfur | 2 | 2 | 2 | 2 | 2 | 2 |
| Vulcanization accelerator NS | 1 | 1 | 1 | 1 | 1 | 1 |
| Sheet thickness at roll extrusion (mm) | 1 | 1 | 1 | 1 | 1 | 3 |
| Number of sheet lamination | 3 | 3 | 3 | 3 | 3 | 1 |
| Joint number in one circuit | 1 | 1 | 0 | 1 | 1 | 1 |
| Evaluation result | | | | | | |
| E * a (Circumferential direction) | 5.0 | 4.4 | 5.0 | 3.0 | 3.5 | 3.6 |
| Viscoelasticity E * a (Circumferential direction)/ E * b (Radial direction) | 1.6 | 1.6 | 1.6 | 1.1 | 1.1 | 1.2 |
| Steering stability | 3 | 2 | 3 | 1 | 3 | 2 |
| Ride quality | 2 | 3 | 2 | 2 | 1 | 2 |
| FV | Equivalent to basis | Equivalent to basis | Good | Basis | Equivalent to basis | Equivalent to basis |
| Cut resistance | 107 | 105 | 107 | 100 | 102 | 105 |
| Crack growth resistance | 105 | 108 | 105 | 100 | 98 | 103 |
| Processability | ○ | ○ | ○ | ○ | ○ | ○ |

TABLE 2

|  | Example | | | | |
|---|---|---|---|---|---|
|  | 1 | 4 | 5 | 6 | 7 |
| Blending amount (parts by weight) | | | | | |
| Base | | | | | |
| NR | 40 | 40 | 10 | 20 | 60 |
| Syndiotactic 1,2-polybutadiene rubber (1): VCR412 | 60 | — | 90 | 80 | 40 |
| Syndiotactic 1,2-polybutadiene rubber (2): VCR617 | — | 60 | — | — | — |
| Carbon black | 55 | 55 | 55 | 55 | 55 |
| Aroma oil | 10 | 10 | 10 | 10 | 10 |

TABLE 2-continued

|  | Example | | | | |
| --- | --- | --- | --- | --- | --- |
|  | 1 | 4 | 5 | 6 | 7 |
| Wax | 2 | 2 | 2 | 2 | 2 |
| Antioxidant | 2 | 2 | 2 | 2 | 2 |
| Stearic acid | 2 | 2 | 2 | 2 | 2 |
| Zinc oxide | 2 | 2 | 2 | 2 | 2 |
| Vulcanizing agent | | | | | |
| Sulfur | 2 | 2 | 2 | 2 | 2 |
| Vulcanization accelerator NS | 1 | 1 | 1 | 1 | 1 |
| Sheet thickness at roll extrusion (mm) | 1 | 1 | 1 | 1 | 1 |
| Number of sheet lamination | 3 | 3 | 3 | 3 | 3 |
| Joint number in one circuit | 1 | 1 | 1 | 1 | 1 |
| Evaluation result | | | | | |
| E*a (Circumferential direction) | 5.0 | 8.0 | 5.6 | 5.3 | 4.5 |
| Viscoelasticity E*a (Circumferential direction)/E*b (Radial direction) | 1.6 | 2.0 | 1.8 | 1.7 | 1.5 |
| Steering stability | 3 | 3 | 3 | 3 | 2 |
| Ride quality | 2 | 1 | 2 | 2 | 2 |
| FV | Equivalent to basis | Equivalent to basis | Equivalent to basis | Equivalent to basis | Equivalent to basis |
| Cut resistance | 107 | 112 | 97 | 103 | 110 |
| Crack growth resistance | 105 | 110 | 95 | 101 | 107 |
| Processability | ○ | ○ | X | Δ | ○ |

TABLE 3

|  | Example | | | |
| --- | --- | --- | --- | --- |
|  | 1 | 8 | 9 | 10 |
| Blending amount (parts by weight) | | | | |
| Base | | | | |
| NR | 40 | 40 | 40 | 40 |
| Syndiotactic 1,2-polybutadiene rubber (1) | 60 | 60 | 60 | 60 |
| Carbon black | 55 | 55 | 55 | 55 |
| Aroma oil | 10 | 10 | 10 | 10 |
| Wax | 2 | 2 | 2 | 2 |
| Antioxidant | 2 | 2 | 2 | 2 |
| Stearic acid | 2 | 2 | 2 | 2 |
| Zinc oxide | 2 | 2 | 2 | 2 |
| Vulcanizing agent | | | | |
| Sulfur | 2 | 2 | 2 | 2 |
| Vulcanization accelerator NS | 1 | 1 | 1 | 1 |
| Sheet thickness at roll extrusion (mm) | 1 | 0.2 | 0.8 | 1.5 |
| Number of sheet lamination | 3 | 15 | 4 | 2 |
| Joint number in one circuit | 1 | 1 | 1 | 1 |
| Evaluation result | | | | |
| E*a (Circumferential direction) | 5.0 | 5.8 | 5.2 | 4.3 |
| Viscoelasticity E*a (Circumferential direction)/E*b (Radial direction) | 1.6 | 1.9 | 1.7 | 1.4 |
| Steering stability | 3 | 3 | 3 | 2 |
| Ride quality | 2 | 2 | 2 | 2 |
| FV | Equivalent to basis | Equivalent to basis | Equivalent to basis | Equivalent to basis |
| Cut resistance | 107 | 107 | 107 | 107 |
| Crack growth resistance | 105 | 105 | 105 | 105 |
| Processability | ○ | Δ | ○ | ○ |

INDUSTRIAL APPLICABILITY

According to the present invention, the syndiotactic 1,2-polybutadiene in a sidewall can be positively oriented in an extrusion direction by extruding rubber sheets with a thickness of at most 1.5 mm from a rubber composition for a sidewall comprising a diene rubber component comprising the syndiotactic 1,2-polybutadiene and laminating the rubber sheets to prepare a sidewall, and as a result, anisotropic effect appears in complex modulus in an extrusion direction and in its 90° direction. As a result, a pneumatic tire improving ride quality and steering stability can be provided.

The invention claimed is:
1. A pneumatic tire comprising a carcass, a tread and a sidewall, the sidewall being pasted with both the carcass and the tread, the sidewall having a single rubber composition, the rubber component of the rubber composition comprising at least a natural rubber and a butadiene rubber comprising syndiotactic 1,2-polybutadiene crystals dispersed therein, wherein the sidewall has a thickness of 2 to 6 mm and includes at least one laminated rubber sheet with a thickness of at most 1.5 mm, said at least one rubber sheet having a complex modulus $E^*a$ of 3 to 15 MPa in a tire circumferential direction, measured at 70° C. at a dynamic distortion of 2%, and wherein the ratio ($E^*a/E^*b$) of the complex modulus $E^*a$ in a tire circumferential direction with respect to a complex modulus $E^*b$ in a tire radial direction, measured at 70° C. at a dynamic distortion of 2% is 1.6 to 1.9.

2. The pneumatic tire of claim 1, wherein the rubber composition for a sidewall further comprises 30 to 60 parts by weight of carbon black based on 100 parts by weight of the rubber component.

3. A pneumatic tire comprising a carcass, a tread and a sidewall, the sidewall being pasted with both the carcass and the tread, the sidewall having a single rubber composition, the rubber component of the rubber composition comprising at least a natural rubber and a butadiene rubber comprising syndiotactic 1,2-polybutadiene crystals dispersed therein, wherein the rubber composition comprises 30 to 80% by weight of said natural rubber and 20 to 70% by weight of said butadiene rubber, wherein the sidewall has a thickness of 2 to 6 mm and includes at least one laminated rubber sheet with a thickness of at most 1.5 mmm, said at least one rubber sheet having a complex modulus $E^*a$ of 3 to 15 MPa in a tire circumferential direction, measured at 70° C. at a dynamic distortion of 2%, and wherein the ratio ($E^*a/E^*b$) of the complex modulus $E^*a$ in a tire circumferential direction with respect to a complex modulus $E^*b$ in a tire radial direction, measured at 70° C. at a dynamic distortion of 2% is 1.6 to 1.9.

4. A pneumatic tire comprising a carcass, a tread and a sidewall, the sidewall being pasted with both the carcass and the tread, the sidewall having a single rubber composition, the rubber component of the rubber composition comprising at least a natural rubber and a butadiene rubber comprising syndiotactic 1,2-polybutadiene crystals dispersed therein, wherein the content of syndiotactic 1,2-polybutadiene in the butadiene rubber is 3 to 25% by weight, wherein the sidewall has a thickness of 2 to 6 mm and includes at least one laminated rubber sheet with a thickness of at most 1.5 mm, said at least one rubber sheet having a complex modulus $E^*a$ of 3 to 15 MPa in a tire circumferential direction, measured at 70° C. at a dynamic distortion of 2%, and wherein the ratio ($E^*a/E^*b$) of the complex modulus $E^*a$ in a tire circumferential direction with respect to a complex modulus $E^*b$ in a tire radial direction, measured at 70° C. at a dynamic distortion of 2% is 1.6 to 1.9.

* * * * *